Figure 1:
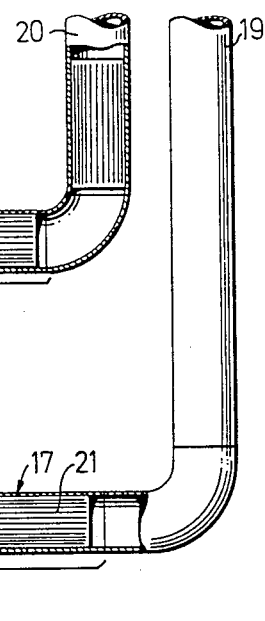

United States Patent [19]

Thunberg

[11] Patent Number: 4,815,522
[45] Date of Patent: Mar. 28, 1989

[54] VENTILATION PLANT

[76] Inventor: Svante Thunberg, Mälartorget 19, S-11127 Stockholm, Sweden

[21] Appl. No.: 641,950

[22] PCT Filed: Dec. 14, 1983

[86] PCT No.: PCT/SE83/00455
§ 371 Date: Aug. 14, 1984
§ 102(e) Date: Aug. 14, 1984

[87] PCT Pub. No.: WO84/02392
PCT Pub. Date: Jun. 21, 1984

[30] Foreign Application Priority Data

Dec. 15, 1982 [SE] Sweden ................... 8207166

[51] Int. Cl.$^4$ ............................................. F28D 17/00
[52] U.S. Cl. ........................................ 165/4; 165/7; 165/10
[58] Field of Search ...... 165/4, 10, DIG. 2, DIG. 12, 165/7

[56] References Cited

U.S. PATENT DOCUMENTS

| | | | |
|---|---|---|---|
| 2,011,117 | 8/1935 | Richter | 165/4 X |
| 2,602,645 | 7/1952 | Benenati et al. | 165/4 |
| 2,862,434 | 12/1958 | Edwards | 165/DIG. 12 |
| 3,263,400 | 8/1966 | Hoke et al. | 165/4 X |
| 3,978,912 | 9/1976 | Penny et al. | 165/4 |
| 4,049,404 | 9/1977 | Johnson | 165/4 X |
| 4,337,585 | 7/1982 | Hebrank | 165/4 X |
| 4,493,366 | 1/1985 | Ekman | 165/4 X |

FOREIGN PATENT DOCUMENTS

| | | | |
|---|---|---|---|
| 512308 | 12/1952 | Belgium | 165/10 |
| 626559 | 8/1961 | Canada | 165/10 |
| 1451156 | 2/1969 | Fed. Rep. of Germany | 165/4 |
| 1004573 | 9/1965 | United Kingdom | 165/4 |

*Primary Examiner*—Harold Joyce
*Attorney, Agent, or Firm*—Young & Thompson

[57] ABSTRACT

A ventilation plant for recovering heat from the outlet air and preheating the inlet air consists of a valve housing (10) including two fans (15, 16) for controlling the flow of air in two duct pipes (17, 18) connected to the surrounding atmosphere. An accumulator tube (17A, 18A), coupled into these two pipes, comprises a number of loosely inserted rolls (21) of pleated metal foil to achieve a great number of axial ducts communicating (24, 25) with one another at the roll ends. In one position the valve (26) leads the inlet air through one of the duct pipes and out through an outlet (13) in the valve housing at the same time as the outlet air is led into the other duct pipe and out to the surrounding atmosphere, or vice versa.

1 Claim, 2 Drawing Sheets

U.S. Patent   Mar. 28, 1989   Sheet 1 of 2   4,815,522

VENTILATION PLANT

The present invention relates to a ventilation plant of the kind for the recovery of heat or cold in the outlet air and for preheating the inlet air to dwelling rooms or other heated localities such as workrooms, cowsheds, basements, foundations, cold-stores and the like. This type of plant is known for example from European patent application No. 0078783.

The purpose of the present invention is to provide an uncomplicated ventilation plant which can be assembled from simple and relatively inexpensive components while still maintaining the efficiency of the plant at a sufficiently high level.

This purpose is achieved with a plant which according to the invention has the features described hereinafter.

The heat exchangers included in the plant are duct heat exchangers representing a type of cyclically regenerative heat exchangers in which the heat-storing elements are alternatingly flushed through by the heating and the heated medium.

Up to now, heat exchangers have been designed as chamber heat exchangers and not as duct heat exchangers. In the past, the efficiency of the chamber heat exchangers in ventilation plants could only be achieved up to an average temperature efficiency of about 80% without oppressively high costs. In the plant according to the present invention the efficiency can be considerably increased simultaneously as the aggregate can be made less space-requiring and less expensive than the existing products with lower efficiency.

The chamber heat exchangers on today's market have limited heat-recovering capacity and are highly efficient only when the outlet air contains a certain excess of energy-carrying humidity, due to the fact that this surplus energy is exploited in the efficiency and that the kinetic energy of the fans is utilized in the form of excess heat.

The primary reason for low temperature efficiency in chamber heat exchangers is that the accumulator packages have much too limited surface areas and that the air cannot therefore effectively be brought into heat-emitting and heat-absorbing contact with the heat-storing elements.

With small accumulator surface areas the air speed is forced down in the accumulator portion in order to increase the thermal efficiency.

For improving the contact between known accumulators and air, the accumulator plates have been folded to enable the occurrance of turbulent air currents despite low air speed. The low speed of the air contributes to the risk of condensate precipitation and frost formation in the accumulator at low temperatures.

In addition, the possibilities of drying up the microcondensate deposited on the accumulator package are limited when dry cold air is heated and capable of taking up this moisture.

One reason for having such small accumulator surfaces is the opinion that a greater mass would be required for the accumulators due to the minute-long cycling periods of the valve means in normal operation.

The accumulators of the plant according to the invention are characterized in that, instead of a great mass, the accumulator has been given larger heat-absorbing and heat-emitting areas. The accumulators have been designed so as to cause the least possible degree of air turbulence at low speeds in view of the fact that the turbulence will increase with accelerating air speed in tubular ducts. In this way a satisfactory contact between air and accumulator walls is accomplished without artificially trying to create turbulence by purposely restricting the passage of air. Also, the accumulators have been given an elongated shape intended to increase the emission and absorption of heat at higher air speeds.

In this way the enlarged accumulator surfaces contribute to the moisture deposit spreading over a larger area as this moisture is not ventilated through the accumulator package and out. Moisture deposits dispersed over a larger area as a thin film, or a smaller amount per surface unit in combination with higher air speed, will diminish the drawbacks of moisture deposit and frost formation while simultaneously lowering the costs of the accumulator packages by a reduced material consumption.

When placed in a cold space the elongated packages may be affected by the exterior temperature, which may disturbingly influence the function of the package. These disadvantages can be eliminated by providing a pressure, temperature and moisture equalization in the elongated accumulator package. To this end the accumulator package is divided into a plurality of smaller units with intermediate gaps thus creating a passage for enabling an equalization between said divergencies in the accumulator. This measure has also led to a higher efficiency in other respects, particularly when trying to shorten the length of the elongate accumulator. The improved heat recovery has however not caused any disturbing pressure drop. As moisture deposits primarily occur at 0° C. and as it is essential to maintain a high air speed when this occurs, the cross-sectional area of the accumulator may be enlarged on the hot side without therefore risking any moisture problems.

The portion of the accumulator package facing the heat source may therefore be given a larger cross-sectional area which is then diminished so as to enforce a higher air speed thus preventing disturbances in the form of moisture deposit and frost formation in the colder portions of the aggregate. The moisture will thereby be thrust out along with the air current to a greater extent while simultaneously improving the moisture absorbing capacity when the temperature of the inflowing air is raised.

In the novel accumulator construction, each accumulator element has a length of approx. 0.5 m; the entire accumulator package generally having a total length of 2-3 m. This means that the thermal conductivity resistance of the accumulator metal is so great that any accumulator partition intended to break the cold bridge is negligible and has no practical value.

The essential difference is that with the inventive plant the problem to be solved does not concern the thermal conduction from the ends of the aggregate, but instead the fact that cooling/heating of the accumulator takes place from the side, which creates a difference between various portions of the transferred air. When the assembly is placed in a cold attic for example, the temperature is lower in the peripheral ducts of the exchanger package. In order to counteract functional disturbances in the assembly it is therefore necessary to provide temperature, pressure and moisture equalization in the different portions of the accumulator package. According to the invention, this is avoided thus markedly reducing the risk of operational disturbances due to moisture deposits followed by frost formation in the colder portions of the package.

In heat exchangers of elongated shape and which are disposed in ducts placed in cold spaces such as cold attics, the determining factor is not the axial problems of the accumulator portion but instead the freezing problems occurring at right angles to the duct. These problems have been solved according to the invention by dividing the accumulator into several units.

In a preferred embodiment the desired simplicity is achieved by using standardized cylindrical pipes which can be cut into chosen lengths and connected to pipe bends and other attachments in a simple manner to form the duct system. Two duct pipes are connected at one end to the surrounding atmosphere and at the other end to a simple valve housing which has an inlet for relatively warm outlet air and an outlet for heated inlet air. The valve housing is coordinated with two fans, and by setting a valve means in the valve housing at one or the other position of the valve means, inlet air can be made to flow into one pipe and outlet air to flow out of the other pipe, and vice versa. A straight tube is coupled with each pipe, and because it comprises a number of heat-accumulating bodies it is called the accumulator tube. These accumulator bodies each consist of a roll made of thin metal plate or foil less than 0.7 mm thick, preferably aluminium foil having a thickness of approx. 0.1 mm, said metal plate or foil being corrugated or plated with closely lying folds having a height in the area of 2–10 mm, suitably about 4 mm. This corrugated plate or foil, together with a smooth and thin metal sheet or aluminium foil which is also suitably about 0.1 mm thick, is preferably helically wound into a roll having an outer diameter approximately equal to the inner diameter of the accumulator tube. A number of such rolls are loosely inserted one after the other into the accumulator tube, and due to their relatively short length the number of rolls can be chosen as required and the accumulator tube be cut to a length corresponding thereto. The advantage of having several short accumulator rolls of this type instead of one single long roll is that a stop or a gap is obtained at several points along the accumulator body consisting of a number of rolls. Even if the rolls abut against each other end to end, a certain radial leakage will occur resulting in a desirable distribution of pressure, temperature and humidity while simultaneously interrupting the axial thermal conduction in the metal material of the duct walls. The space between the roll ends can also be varied as desired in order to create a larger or smaller distribution chamber between the roll ends. By substituting a long roll of the type in question for a number of short rolls, e.g. three rolls in a performance test, a thermal efficiency improved by about 20 percent units was recorded.

The short accumulator rolls also provide considerable advantages with respect to storage, transport and handling.

A suitable embodiment of the inventive plant is schematically illustrated in the accompanying drawings.

Figure 2:
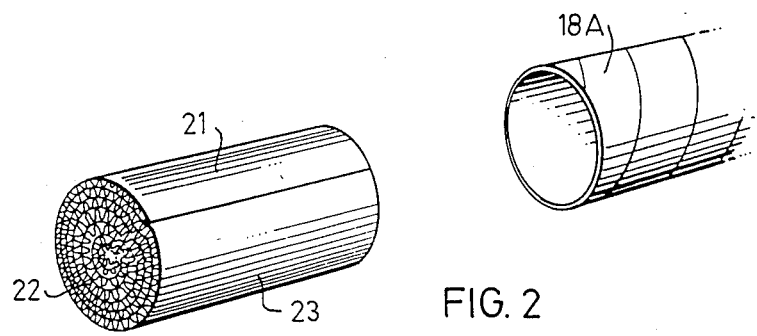
Figure 3:
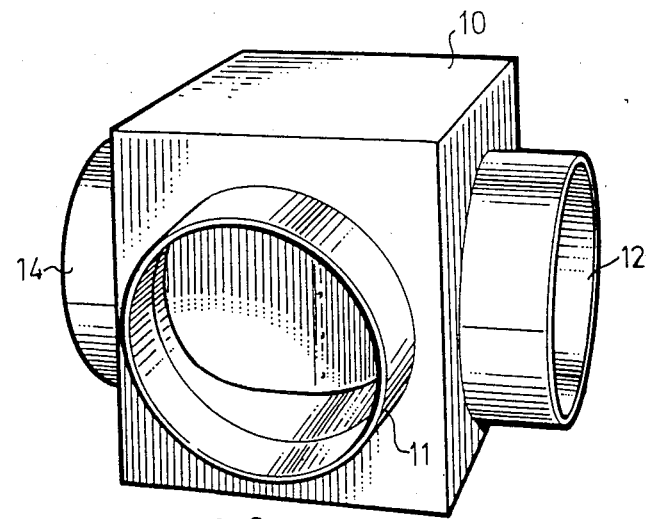
Figure 4:
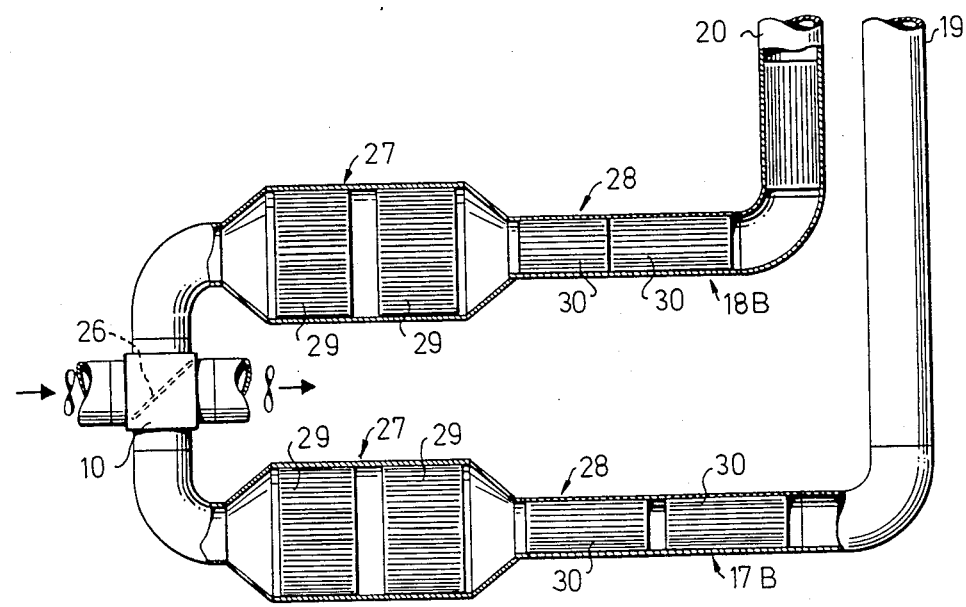

FIG. 1 shows the plant with two duct pipes including a coupled-in accumulator tube with a number of loosely inserted accumulator rolls, FIG. 2 shows schematically a roll insertable into an accumulator tube, FIG. 3 is a schematic perspective view of the valve housing, and FIG. 4 shows a modification of the accumulator tubes.

The plant comprises a valve housing 10 with four uniformly distributed connections 11,12,13,14 of which one connection 11 forms an inlet for relatively warm outlet air from a dwelling room or other location and is combined with an induction fan 15. The opposite connection 13 forms an outlet for heated inlet air blown out into the locality in question by means of a fan 16. Two duct pipes 17,18 consisting of straight cylindrical tubes and bent joints removably attached to the straight tubes are coupled to the two other connections 12,14.

The two duct pipes 17,18 are connected at their outer end portions 19,20 to the ambient atmosphere in a suitable manner (not shown).

The duct pipe 17 comprises an accumulator tube 17A coupled into the pipe, and an accumulator tube 18A is coupled into the pipe 18. The two accumulator tubes contain a number of accumulator rolls 21 preformed in accordance with FIG. 2.

Each roll 21 consists of a pleated or corrugated thin aluminium foil 22 with a thickness of approx. 0.1 mm and a smooth aluminium foil 23 with a thickness of approx. 0.1 mm. These foils are rolled up into the illustrated roll thereby forming a great number of axial ducts having a large total heating area. The length of the roll is relatively short and suitably between two and three times the diameter of the roll.

In the embodiment shown, four rolls 21 are inserted into each accumulator tube 17A and 18A, but the number of rolls can be greater or less owing to the circumstances.

As indicated in FIG. 1 the rolls may lie in abutment end to end which however provides a leakage gap 24 between the ends; or the ends may lie more or less spaced apart to form a wider gap 25. In both cases the thermal conduction is interrupted along the total accumulator body formed by the rolls 21, and simultaneously a radial communication between the axial ducts is obtained at each joint or gap, which results in the desired distribution of pressure, thermal and humidity. In this way the temperature efficiency of the plant is considerably increased in relation to an embodiment in which the number of separate rolls has been replaced by one single long roll.

The valve housing comprises a valve means 26 which can be set at two different end positions. In the illustrated position, outlet air is sucked in and blown out through the pipe 18 to the surrounding atmosphere after the outlet air has heated the rolls 21 in the accumulator tube 18A, while at the same time inlet air is sucked in through the pipe 17 and absorbs heat from the rolls 21 in the accumulator tube 17A before the inlet air thus heated is blown out through the outlet 13 and into the room or the like. By resetting the valve means into its opposite end position, the air flow conditions will be reversed.

As described above, the structure of the plant is extremely simple and can therefore be manufactured at a relatively low cost. The valve housing including the fans has a simple design, and the rolls insertable into the accumulator tube can also be manufactured in a simple and inexpensive way. The tubes and tube joints are standardized products which can be cut to chosen lengths and mounted in desired positions for individual adjustment to existing localities.

The modification of the accumulator tubes 17B and 18B, shown in FIG. 4, consists of a tube 27 of larger diameter and a tube 28 of smaller diameter, the two tubes each containing a pair of accumulator rolls 29 and 30. Due to the larger diameter of the rolls 29 on the hot side of the tube, the air resistance and pressure drop will be lower in this section of the accumulator tube. When the air is cooled, some of its moisture content forms a condensate which is led off more effectively by accelerating the air speed, and this is achieved in the constricted section 28 of the accumulator tube, i.e. in the tube 28 with the rolls 30. This embodiment is preferred when it is desired to avoid in the best way possible the disadvantages which may arise from moisture deposits at low air speeds. With this modification it is possible to reduce the total air resistance and pressure drop which would otherwise restrict the air flow through the plant and also create a need for fans of larger dimensions.

I claim:

1. In a ventilation plant for changing the temperature of air, comprising at least two straight tubes, a valve housing with valve means in combintion with fan means controlling the flow of air through said tubes in a selected direction, each tube having a plurality of accumulator bodies inserted in the tube, each accumulator body having a cross section adapted to fill up the associated accumulator tube, each accumulator body consisting of a composite comprised by a flat metal foil and a pleated metal foil rolled up in a spiral thereby to provide a multiplicity of small openings extending axially through the accumulator bodies; the improvement in which the accumulator bodies are longer in an axial direction than their diameter, and in which at least two of the accumulator bodies in each of said straight tubes are spaced apart by a gap, the axial extent of each of said accumulator bodies being two to three times its diameter, and the outermost surface of each said body comprising the outermost turn of said flat metal foil rolled up in a spiral.

* * * * *